Sept. 30, 1958  F. C. COLLIN  2,854,311
PROCESS FOR TREATING TAR-CONTAINING
GASES FROM ALUMINUM FURNACES
Filed July 1, 1955
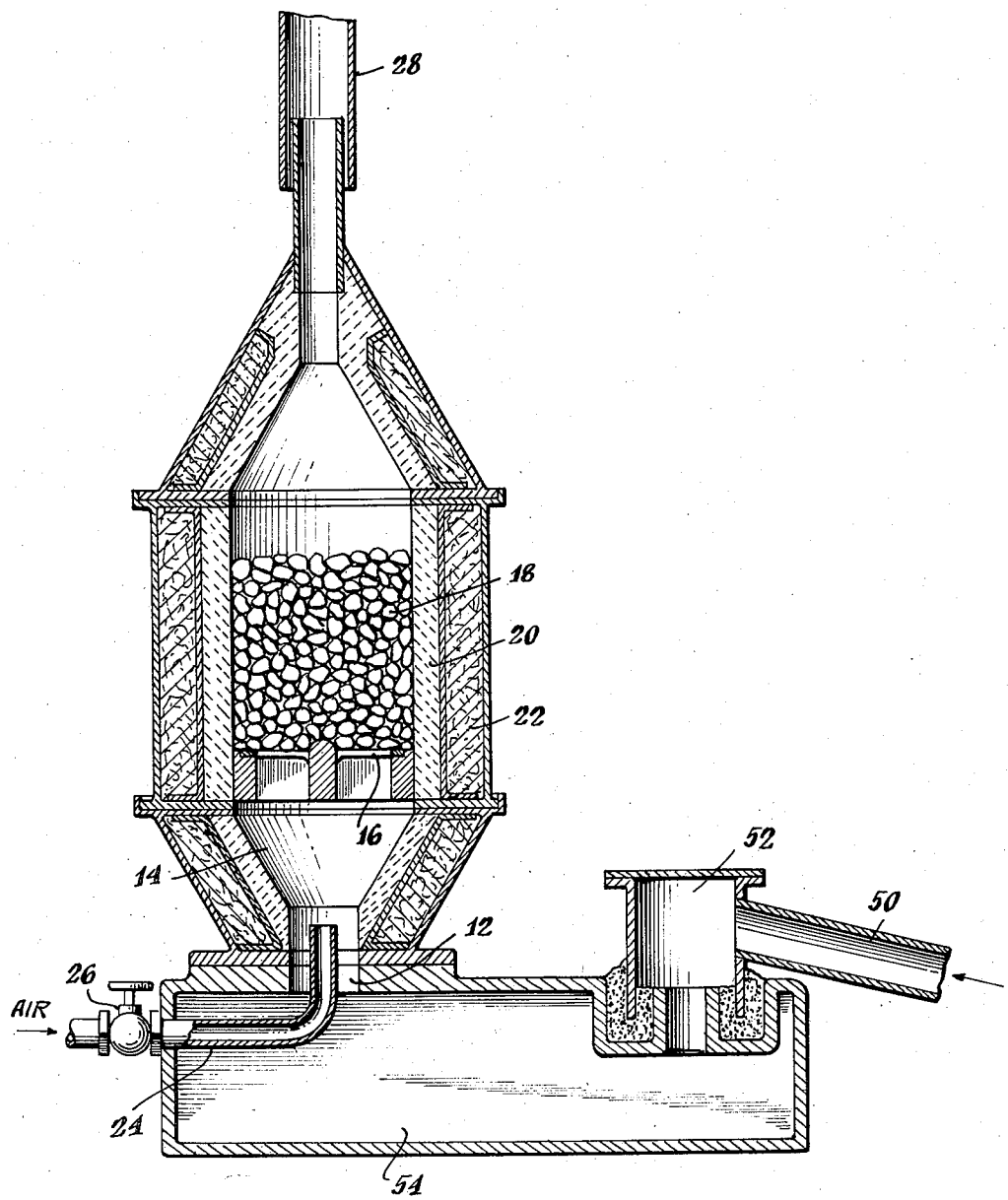
INVENTOR
Fredrik Christen Collin
BY
Eyre, Mann & Burrows
ATTORNEYS

United States Patent Office 2,854,311
Patented Sept. 30, 1958

2,854,311

PROCESS FOR TREATING TAR-CONTAINING GASES FROM ALUMINUM FURNACES

Fredrik Christen Collin, Oslo, Norway, assignor to Elektrokemisk A/S, Oslo, Norway, a corporation of Norway Application July 1, 1955, Serial No. 519,579

Claims priority, application Norway August 4, 1954

1 Claim. (Cl. 23—2)

In many modern aluminum furnaces using continuous (Soederberg) electrodes, and particularly in the furnaces using vertical studs for supporting the movable electrode, the gas from the furnace is now collected around the electrode in relatively high concentrations. Since the paste used in the Soederberg type electrodes consists of calcined coke with pitch as a binding agent, volatile constituents are driven off from the binding agent during the baking of the electrode, with the result that the furnace gases collected around the electrode are strongly contaminated with tar fumes. These fumes tend to condense when cooled and if an attempt is made to conduct the furnace gases any substantial distance away from the furnace, there is danger that the condensed tars may clog the pipes. Also from time to time as the furnace is stoked the concentration of air mixed with the gases may rise up to the explosive level. This creates a substantial risk if an attempt is made to conduct the gases off any substantial distance.

Because of this situation, it has up till now been found expedient to burn the furnace gases quite close to the pot where they are generated by mixing the gases with air. When this is done, the volume of the gas is increased up to 15 to 20 times its original volume and all of the CO gas in the fumes is converted to $CO_2$ so that its heat value is wasted.

The present invention is based upon my discovery that if these fumes are passed through a chamber having a packing to provide a large exposed surface and this packing is kept at a temperature of between 600° and 1000° C. (preferably between 700° and 900° C.) an almost complete cracking or pyrolytic decomposition of the tar fumes will be obtained. By this reaction simple hydrocarbons are formed (which themselves have appreciable heat values) while carbon is deposited on the packing.

The temperature of the gases as they leave the aluminum furnace will be in the order of about 500° C. In order to supply the heat necessary to maintain the packing at the desired temperature as well as to cause the cracking to take place, a small amount of air can be admitted into the gas stream just before it enters the chamber where the cracking is to take place, and this air will be burned with a small amount of the CO that is present in the fumes. I have found that the heat can readily be maintained by burning only as little as from 6% to 10% of this CO. The temperature of the contact mass can be measured in any desirable way as by a thermocouple and the proper temperature can be controlled and maintained by controlling the amount of air admitted.

The packing in the chamber may be one formed of coke. This is preferably in pieces ranging from about ⅜ inch to an inch in diameter. Coke is a common material in all aluminum plants and therefore is readily at hand. Further, the use of coke has considerable advantages. When coke is used, the starting of the gas purification is very simple and relatively safe as the heater can be heated up like a usual coke furnace. When the coke becomes red hot, the gas from the furnace is led in so the temperature is maintained with very little coke consumption. Another advantage in using coke as the packing is that all risk of explosion is eliminated resulting from the mixing of air with the gases incident to breaking down the crust. If there is an excess of air it will react with the red hot coke so that the gas leaving the cracking chamber will be practically freed from oxygen.

This invention may be readily understood by reference to the accompanying drawing which shows a sectional view through an apparatus for carrying out my invention.

In the drawing I show a device for use with my invention connected with an aluminum furnace of the type shown in U. S. Patent No. 2,526,875. In the drawing the pipe 50 is the pipe which conducts the furnace gases from the collection chamber and this pipe has the same designation in U. S. Patent No. 2,526,875. As in that earlier patent, the numeral 52 is an inverted cup welded to the pipe 50 and this cup fits down into a recess formed in the upper surface of the gas-receiving chamber 54. The gas from the chamber 54 passes up through the passage 12 into the chamber 14 which is provided with a grate 16 that supports the contact charge 18 formed of pieces of coke as described. The wall of the chamber has a refractory lining 20 outside of which is insulation 22.

The gas in the chamber 54 will be still hot from the furnace and will have a temperature of at least 400° and usually about 500° C. In order to heat the chamber 14 and the coke 18 up to a temperature of about 800° C. a pipe 24 is provided equipped with a valve 26. This pipe is open to the outside air so that a controlled amount of air will be burned in the chamber 14 with some of the CO of the gases. Also when the furnace is started up, air is admitted through the pipe 24 and the coke 18 is ignited until it becomes incandescent. Furnace gases are then permitted to pass up through the passage 12 and through the mass of coke 18 where the tar vapors will be cracked or decomposed.

I have found that a contact time between the gas and the coke of from 5 to 10 seconds gives a practically complete cracking of the tar components. Some carbon will be deposited from the cracked tar vapors and this will tend to equalize the coke which is consumed at the times when an excess of air is mixed with the gas.

It will be found that the gas entering the chamber 14 will bring along some fluorine compounds and alumina dust which will be deposited in the lower part of the packing. By shaking the grate 16 in a usual manner the charge 18 will be freed of this dust which can then fall back into chamber 54 which can be cleaned out from time to time and returned to the furnace.

While I have illustrated my invention in conjunction with a gas pipe 50 and a gas chamber 54 as illustrated in U. S. Patent No. 2,526,875, it is to be noted that any convenient form of device for conducting the gas from the collecting chamber of the aluminum furnace may be employed but the connection should be short enough so that the gases still remain hot from the furnace, i. e. over about 400° C.

The residual gas will pass out through the pipe 28 and since the gas will be substantially free of dust or condensable tars or of air that may cause explosion, it may be conducted to any desired point as, for example, to a cryolite recovery installation. In this case the cryolite recovery will be much more efficient than is normally the case because the total volume of the gas to be treated will only be about 5% to 10% of the normal but still will contain all of the cryolite residues.

It will further be found that the gases recovered from this process contain the major proportion of the CO generated in the aluminum furnace, which is available for other purposes as, for example, in the production of alumina from bauxite.

What I claim is:

The method of obtaining from an aluminum reduction furnace a gas mixture comprising CO and simple hydrocarbons derived by cracking tar fumes but substantially free from uncracked tar fumes, which comprises withdrawing from the heating zone of a Soderberg type furnace used for the reduction of alumina, gases comprising CO contaminated with tar fumes, mixing a controlled amount of air with such gases while they are still at a temperature of at least 400° C. from the heat of the furnace, heating a contact mass made of carbonaceous materials by burning a portion thereof with air, after which the said gas mixture is passed through such hot mass with a deficiency of air relative to CO, the amount of air mixed with the gases and burned with one CO of the gas mixture being so controlled as to supply the heat necessary to maintain the contact mass at a temperature between 600° C. and 1000° C. and to cause cracking of the tar fumes to take place, whereby the tar fumes are decomposed and carbon from the tar fumes is deposited to replace carbon that was burned.

References Cited in the file of this patent

UNITED STATES PATENTS

| | | |
|---|---|---|
| 2,495,613 | Tuttle | Jan. 24, 1950 |
| 2,526,875 | Jouannet | Oct. 24, 1950 |

UNITED STATES PATENT OFFICE
CERTIFICATE OF CORRECTION

Patent No. 2,854,311                                              September 30, 1958

Fredrik Christen Collin

It is hereby certified that error appears in the printed specification of the above numbered patent requiring correction and that the said Letters Patent should read as corrected below.

Column 4, line 5, for the word "one" read -- the --.

Signed and sealed this 16th day of December 1958.

(SEAL)
Attest:

KARL H. AXLINE                                          ROBERT C. WATSON

Attesting Officer                                     Commissioner of Patents